United States Patent Office 2,937,200
Patented May 17, 1960

2,937,200

RESOLUTION OF DL-GLUTAMIC ACID

Harold L. Fike, Chicago, Ill., assignor to International Minerals and Chemical Corporation, a corporation of New York No Drawing. Application June 4, 1958
Serial No. 739,657

11 Claims. (Cl. 260—534)

This invention relates to the resolution of DL-glutamic acid compounds. More particularly, it relates to a stereospecific additive for effecting preferential crystallization of optically active glutamic acid compounds from supersaturated solutions of the mixed enantiomers thereof.

Amino acids such as glutamic acid are generally useful only in the form of the L-isomer, which is the form ordinarily occurring in nature. When such compounds are synthesized by chemical means, the product is almost invariably a racemic mixture of enantiomorphs—e.g., DL-glutamic acid. Various methods have been devised for resolving such racemic mixtures, including reaction with an organic base in optically active form, selective seeding of a supersaturated solution with crystals of one enantiomorph, and a variety of other techniques. Most of these prior-art methods are open to one objection or other chiefly arising out of the high cost of the procedures and/or reagents employed, or out of inadequate separation of the enantiomorphs. A method is still needed which will effect essentially complete separation of the enantiomers at reasonable cost.

An object of the present invention is to separate mixtures of D- and L-glutamic acid compounds substantially completely into the individual enantiomers.

Another object is to provide an economical and commercially attractive method for resolving DL-glutamic acid compounds.

Another object is to selectively crystallize a glutamic acid compound in optically active form from a supersaturated racemic solution thereof while repressing crystallization of its enantiomer.

Other objects of the invention will be apparent from the following description and claims.

In accordance with the present invention, a glutamic acid compound is crystallized in optically active form from a supersaturated aqueous solution of a mixture of the enantiomers thereof containing dissolved therein a gamma ester of glutamic acid in the opposite optically active form. The presence of the said ester represses the crystallization of the glutamic acid compound having the same optical rotation as the ester, so that the desired enantiomorph is obtained in essentially pure form.

In one embodiment of the invention, an aqueous solution supersaturated with DL-glutamic acid is prepared, containing methyl L-glutamate as the added ester. The said solution deposits crystals of D-glutamic acid on being allowed to stand for a period of time, preferably with gentle agitation. The crystallization can be hastened if desired by adding crystals of D-glutamic acid to the supersaturated solution. In any event, the crystallization of D-glutamic acid ordinarily reaches completion in about 12 to about 24 hours. At the end of this time, the crystals are mechanically removed by filtration, centrifugation, settling, and decantation, or by other means known to the art, after which they may be washed with water, and are then dried. The resulting product is ordinarily at least about 95 to about 98% pure, and under carefully controlled conditions, the desired enantiomorph can be obtained in essentially pure form.

The required supersaturated solution is conveniently obtained by a variety of means known to the art. For example, the particular racemic glutamic acid compound can be dissolved in hot water, then cooled below the saturation temperature. Alternatively, a highly soluble glutamic acid compound can be dissolved in water, then converted in situ into the desired glutamic acid compound of lesser solubility. By appropriate adjustment of the initial concentration, the desired degree of supersaturation can thereby be achieved.

In preparing a supersaturated solution of DL-glutamic acid, for example, it is convenient to dissolve DL-glutamic acid in water at a temperature around 75 to 100° C., then cool the solution to around room temperature (20 to 30° C.). Alternatively, monosodium DL-glutamate can be dissolved in water at ordinary temperatures, then adjusted to pH 3.2 by addition of an acid such as hydrochloric acid, sulfuric acid, or the like. The monosodium DL-glutamate is relatively soluble in water, while DL-glutamic acid is of relatively low solubility, so that the resulting DL-glutamic acid solution can readily be prepared in a high degree of supersaturation. Similarly, supersaturated solutions of DL-glutamic acid hydrochloride, DL-glutamic acid hydrobromide, ammonium DL-glutamate, zinc DL-glutamate, and the like can be prepared and resolved in accordance with the present invention.

Incorporation of the desired stereospecific ester into the solution of glutamic acid compound can conveniently be carried out either before or after supersaturation is reached. As a matter of convenience, especially to avoid premature crystallization, it is preferred to incorporate the ester in the solution before supersaturated conditions have been effected. Thus, both the racemic glutamic acid compound and the stereospecific ester can be dissolved serially or simultaneously in hot water, and the solution thereafter cooled to produce the desired degree of supersaturation. In any event, the ester should be added in at least equimolar proportion to the enantiomorph which is to be retained in solution during the crystallization, and it is distinctly preferred to employ the said ester in at least about 10% excess on this basis. The mechanism whereby the desired result is achieved has not been ascertained. It may involve hydrogen bonding or some other type of complex or compound formation. In any event, it seems to substantially increase the solubility of the glutamic acid enantiomorph having the same optical rotation as the ester, so that there is markedly less tendency of the said glutamic acid enantiomorph to crystallize and contaminate the other enantiomorph.

The primary crystallization can be carried out at substantially any temperature below the supersaturation temperature of the racemic solute, but should preferably be at least about 20° C. above the freezing point of the solution. Thus, in resolving a solution of free DL-glutamic acid in the presence of methyl L-glutamate, crystallization of around 75% of the D-glutamic acid originally present therein in supersaturated condition can be achieved at temperatures around 20 to 25° C., and the product is essentially uncontaminated with L-glutamic acid when equilibrium is reached, i.e., when the supersaturation of the D-glutamic acid is exhausted.

After the primary crystallization has been completed and the crystals have been removed, the residual mother liquor contains a predominating proportion of the opposite enantiomorph, which must be recovered and utilized in some manner if the process is to be commercially practicable. Such recovery is conveniently achieved by cooling the mother liquor to a temperature approaching the freezing point, suitably between about 1 and about 5° C. above the freezing point, and crystallizing in one or more steps. The crystals initially obtained thereby are ordinarily a mixture of both enantiomorphs, and can be recycled for further resolution as in the initial step of the process. By taking one or two such crops of crystals, any residual supersaturation of the first-crystallized enantiomorph can be fully exhausted, after which the other enantiomorph can be crystallized in essentially pure form. The latter enantiomorph thus recovered can be racemized if desired by means well known in the art, and the resulting racemate can be recycled for further resolution. The remaining mother liquor comprises racemic DL-glutamic acid compound and the ester initially employed for resolution, and is conveniently recycled without purification as a solvent for further resolution.

Suitable esters for use in the present invention include any of the gamma esters of D-glutamic acid and L-glutamic acid which are soluble to the required extent in supersaturated solutions of the racemic glutamic acid compound to be resolved. Especially suitable are the lower alkyl esters including the methyl, ethyl, n-propyl, isopropyl, n-butyl, and sec-butyl esters Unsaturated aliphatic esters, esters containing hydrophilic substituents, and the like, can also be employed. Particularly preferred, however, is methyl L-glutamate or its enantiomer, owing to the ease of preparation thereof and the ready solubility thereof in water. In general it can be said that glutamic acid esters are stereospecific for the desired purpose if they are composed of essentially one enantiomorph and if they are soluble in the required proportion in a supersaturated solution of the particular glutamic acid compound to be treated.

The process of the present invention is suitable for resolving a variety of glutamic acid compounds, including free glutamic acid itself, glutamic acid hydrochloride, glutamic acid hydrobromide, ammonium glutamate, zinc glutamate, and other glutamic acid substances wherein the racemic form is more soluble in water than the optically active enantiomorphs. The invention is applicable generally to solutions of such compounds containing both the D- and L-enantiomers in supersaturated condition, including both racemic or DL-solutions and solutions of unbalanced mixtures of the D- and L-enantiomers. Water is the preferred solvent, but the solution may also contain organic liquids such as methanol, ethanol, acetone, dimethylformamide, dioxane, or other organic or inorganic substances as solubility modifiers. The term "aqueous solution," as used herein, is to be understood as contemplating the optional inclusion of such added substances.

The following operating examples will more clearly illustrate the invention.

Example 1

DL-glutamic acid monohydrate (24 grams) was slurried in 300 milliliters of water and dissolved by heating to 75° C. To the solution were added 15 grams of gamma-methyl L-glutamate, which immediately dissolved. The solution was allowed to cool to room temperature (25° C.), and was held at this temperature for 48 hours, during which time crystallization spontaneously began and reached equilibrium. The resulting crystals were filtered off, dried, and found to comprise 7.2 grams of 99% pure D-glutamic acid. This corresponds to 67% resolution, based upon the D-glutamic acid originally present in the solution.

The mother liquor from the foregoing test was further cooled and held at 0° C. for 24 hours, during which time a second crop of crystals was obtained. These crystals, on being filtered off and dried, were found to weight 6.0 grams and to contain 70% L-glutamic acid and 30% D-glutamic acid. This corresponds to a resolution of 22%.

Example 2

Monosodium DL-glutamic dihydrate (58.5 grams, equivalent to 40 grams of DL-glutamic acid) and gamma-methyl L-glutamate (30 grams) were dissolved in 400 milliliters of water. The resulting solution was adjusted to pH 3.2 with about 27 grams of 37% hydrochloric acid, then allowed to stand for 24 hours, during which time crystallization began and reached equilibrium. The crystals were filtered off, dried, and found to comprise 15.8 grams of 96.2% D-glutamic acid, the remainder being L-glutamic acid. This corresponds to 73% resolution, based upon the D-glutamic acid originally present in the solution.

To the mother liquor were added 38.1 grams of monosodium L-glutamate monohydrate (equivalent to 30 grams of L-glutamic acid), and the resulting solution was readjusted to pH 3.2 with 22 grams of 37% hydrochloric acid. Crystallization began during the pH adjustment, and was allowed to continue for 16 hours. The resulting crystals were filtered off, dried, and found to comprise 38.5 grams of pure L-glutamic acid. This corresponds to a resolution of 43%.

The foregoing example illustrates the precipitation of the solubilized isomer by formation of a large proportion of seed crystals in the solution.

While the invention has been illustrated with reference to certain specific glutamic acid compounds, stereospecific esters, manipulative techniques, and processing steps and conditions, it is to be understood that such matters are illustrative only, and not by way of limitation. Numerous modifications and equivalents of the invention will be apparent to those skilled in the art from the foregoing description.

The following claims particularly point out and distinctly claim the subject matter of the present invention.

I claim:

1. In a method for resolving a mixture of the D- and L- forms of a glutamic acid compound selected from the group consisting of glutamic acid, glutamic acid hydrochloride, glutamic acid hydrobromide, ammonium glutamate, and zinc glutamate, said compound being of the class of which the racemic form is more soluble than the individual enantiomorphs, which method comprises preparing an aqueous solution supersaturated with both of the enantiomorphs of said compound, selectively crystallizing one enantiomorph therefrom, and separating the crystallized enantiomorph from the solution, the improvement which comprises incorporating in said solution, prior to crystallization, a lower alkyl gamma ester of glutamic acid in one of its optically active forms, the proportion of said ester to the glutamic acid compound therein of the same optical rotation as said ester being at least about equimolar, and effecting said crystallization at a temperature above about 20° C. in the presence of said ester, whereby the enantiomorph of said glutamic acid compound having the opposite optical rotation to said ester is selectively crystallized while crystallization of the other enantiomorph is repressed.

2. A method as in claim 1 wherein said ester is gamma-methyl glutamate.

3. A method as in claim 1 wherein said solution initially contains said glutamic acid compound in racemic form.

4. A method as in claim 3 wherein said glutamic acid compound is DL-glutamic acid.

5. A method as in claim 3 wherein said glutamic acid compound is DL-glutamic acid hydrochloride.

6. A method as in claim 3 wherein said glutamic acid compound is monoammonium DL-glutamate.

7. A method for resolving DL-glutamic acid compounds which comprises preparing an aqueous solution super-saturated with DL-glutamic acid hydrochloride and having dissolved therein a lower alkyl gamma ester of L-glutamic acid, the proportion of said ester to the L- glutamic acid hydrochloride in said solution being at least about equimolar, crystallizing D-glutamic acid hydrochloride from said solution at a temperature above about 20° C., and separating the crystals from the resulting slurry.

8. A method as in claim 7 wherein said ester is gamma-methyl L-glutamate.

9. A method for resolving DL-glutamic acid compounds which comprises preparing an aqueous solution super-saturated with DL-glutamic acid hydrochloride and having dissolved therein a lower alkyl gamma ester of D-glutamic acid, the proportion of said ester to the D-glutamic acid hydrochloride in said solution being at least about equimolar, crystallizing L-glutamic acid hydrochloride from said solution at a temperature above about 20° C., and separating the crystals from the resulting slurry.

10. A method as in claim 9 wherein said ester is gamma-methyl D-glutamate.

11. A method for resolving DL-glutamic acid compounds which comprises preparing an aqueous solution super-saturated with monoammonium DL-glutamate and having gamma-methyl L-glutamate dissolved therein in at least equimolar proportion to the monoammonium L-glutamate in said solution, crystallizing monoammonium D-glutamate from said solution at a temperature above about 20° C., and separating the crystals from the resulting slurry.

References Cited in the file of this patent

UNITED STATES PATENTS 2,734,919     Amiard et al. _____ Feb. 14, 1956

OTHER REFERENCES

Gilman: Org. Chem., vol. 1 (1938), pp. 187–89.
Houben: Die Methoden der Org. Chem., vol. 2 (1943), p. 1065.